Aug. 30, 1927.

J. W. HOUSE 1,640,408

STANDING VALVE

Filed May 20, 1926

Inventor

J. W. House

By Lacey & Lacey, Attorneys

Patented Aug. 30, 1927.

1,640,408

UNITED STATES PATENT OFFICE.

JOHN W. HOUSE, OF CORSICANA, TEXAS.

STANDING VALVE.

Application filed May 20, 1926. Serial No. 110,518.

The invention relates to a standing valve for deep wells, such as oil, gas and artesian and provides a maximum fluid clearance, instantaneous valve action, nonleakable seat and ability to free the valve from any foreign object by direct action of the travelling valve since no cage is present to obstruct the movement of the travelling valve when lowered.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1:
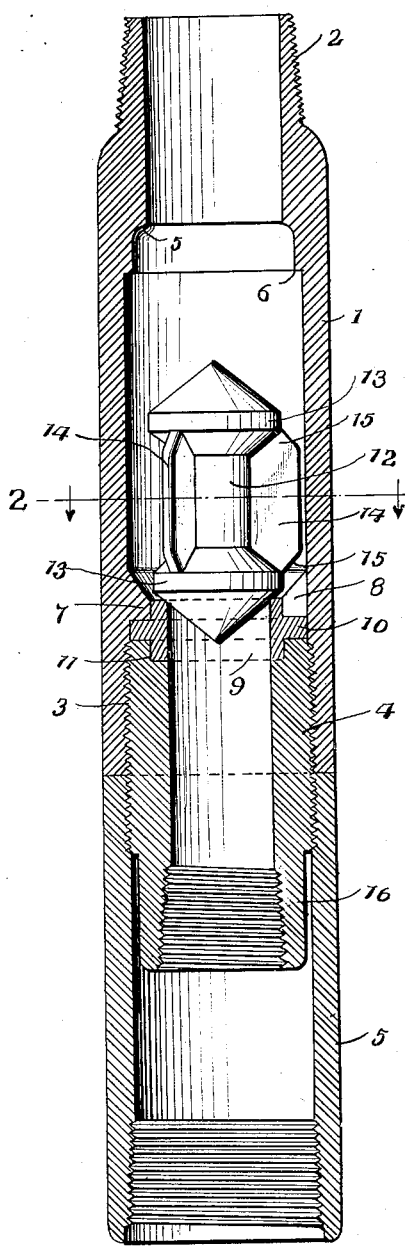
Figure 2:
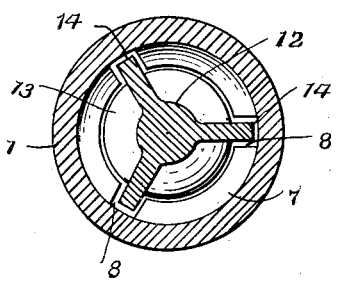
Figure 3:
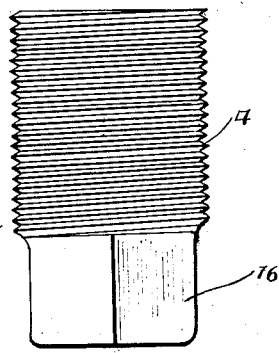
Figure 4:
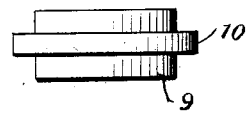

Figure 1 is a sectional view illustrative of the invention, the winged valve being shown in full lines, Figure 2 is a horizontal sectional view on the line 2—2 of Figure 1, Figure 3 is an elevational view of the screw plug or coupling which connects the swage and base, and Figure 4 is a side view of the reversible valve seat.

Corresponding and like parts are referred to in the following description and designated in the several views of the drawings by like reference characters.

The swage 1 forming the casing of the standing valve is open throughout its length and reduced and externally screw-threaded at its upper end, as indicated at 2, for coupling of the casing thereto in a manner well understood. The lower end of the swage 1 is internally screw-threaded, as indicated at 3, to receive the upper end of the screw-plug 4 by means of which the base 5 is coupled to the swage 1. The opening of the swage 1 is constricted at its upper end to form an inner shoulder 6 which provides a stop to limit the upward movement of the valve. An inner shoulder 7 is formed within the lower portion of the swage 1 and its upper face is beveled and its lower face at a right angle to the inner wall of the swage. A plurality of slots 8 are formed in the shoulder 7 and provide passage ways for the wings of the valve. A reversible valve seat is provided and comprises a ring or annular body 9 and an outer flange 10, the latter being of a diameter to fit snugly within the opening of the swage 1. The ring or annular body 9 is of an external diameter to fit snugly within the shoulder 7. The upper end of the screw plug or coupling 4 is recessed, as indicated at 11, to receive an end portion of the ring 9. When the valve seat is in place, it is clamped between the shoulder 7 and the end of the plug 4. It is observed that the slots 8 are closed by the valve seat, thereby preventing displacement of the valve after the parts have been assembled.

The valve is double-ended and reversible and comprises a body 12, heads 13 at opposite ends of the body, and longitudinal wings 14, which are radially disposed and equi-distantly grouped about the body 12. The wings 14 project beyond the sides of the heads 13 and loosely engage the inner wall of the swage 1, so as to direct the valve in its movement and insure its proper seating. The projecting corners of the wings 14 are cut away, as indicated at 15, to prevent injury to the inner wall of the swage or the lodgment of foreign matter thereon. The diameter of the heads 13 corresponds to the inner diameter of the shoulder 7 to admit of the valve passing by said shoulder when placing it in position or removing it from the swage. The wings 14 and slots 8 are positioned so as to register in one position of the valve, whereby provision is had for placing the valve in position or removing it from the swage. When the valve is placed in position and the parts are assembled, displacement of the valve is prevented by the valve seat. The beveled ends 15 of the wings correspond to the upper beveled face of the shoulder 7. The space exterior to the body 12 and between the wings 14 is in excess of the area or space of the valve seat and in consequence a free passage for the fluid is had so that the working or travelling valve is more nearly filled on each upward stroke. This also enables the use of a gas anchor of maximum diameter.

The lower end of the plug 4 is reduced as indicated at 16, and constructed to receive a suitable wrench or tool for turning the plug when entering the same into the lower end of the swage 1 or removing it therefrom. The lower reduced end of the plug 4 is internally threaded to receive the gas anchor and the lower end of the base 5 is also interiorly threaded to receive the usual mud anchor. When the parts are assembled the valve seat is clamped between the shoulder 7 and plug 4 and the abutting ends of the swage 1 and base 5 are in contact, thereby forming non-leakable joints. It is observed that the space above the valve is unobstructed and the upward movement of the valve is limited by the wings 14 coming in contact with the inner stop shoulder 6. Should the standing valve become obstructed, it may be readily cleared by lowering the working or travelling valve through the upper end of the swage and bringing it in contact with the lower or standing valve. This is made possible because of the absence of the usual cage and by the unobstructed space above the lower valve.

The ends of the valve are of conical form and the inner faces of the heads 13 are oppositely inclined to the outer faces of the heads. The opposite taper or inclination of the faces of the heads 13 insures a free passage of fluid with a minimum amount of resistance.

Having thus described the invention, I claim:

1. A valve of the character specified comprising a body, similar heads at opposite ends of the body, having their inner and outer faces oppositely inclined, and wings projecting radially from the body beyond the sides of the head and having the projecting corners cut away.

2. In combination a swage having an inner shoulder formed with slots, a valve provided with outer wings adapted to register with the slots of said shoulder to pass therethrough and a valve seat for closing the slots in the said shoulder and retaining the valve in place.

3. In combination a swage having its opening constricted at one end to provide an inner stop shoulder and having an inner shoulder spaced from said stop shoulder and formed with slots, a valve provided with outwardly disposed wings adapted to register with the slots of the said inner shoulder and a valve seat for closing the slots in the shoulder and retaining the valve in place.

4. The combination with a swage having an inner shoulder formed with slots, a valve provided with outer wings adapted to register with the slots of said shoulder to pass therethrough, a valve seat held against said shoulder and closing the slots thereof to retain the valve in place and a plug threaded to the swage and clamping the valve seat against the said inner shoulder.

5. In combination, a swage having an inner shoulder formed with slots, a double-ended reversible valve having outstanding wings to register with the slots of said shoulder to pass therethrough, a reversible valve seat placed against the said shoulder and closing the slots thereof, and a plug threaded to the swage and serving to clamp the valve seat against the said shoulder, and recessed to receive an end portion of the valve seat.

6. A standing valve comprising a swage having an inner stop shoulder at one end and an inner slotted shoulder at the opposite end, a double-ended reversible valve provided with outwardly disposed wings to register with the slots of the shoulder to pass therethrough, a reversible valve seat placed against the slotted shoulder, a plug threaded into the lower end of the swage and recessed to receive the lower end of the valve seat which is clamped between said plug and the slotted shoulder, and a base threaded to the said plug.

In testimony whereof I affix my signature.

JOHN W. HOUSE. [L. S.]